United States Patent [19]
Aitken et al.

[11] Patent Number: 5,240,885
[45] Date of Patent: Aug. 31, 1993

[54] RARE EARTH-DOPED, STABILIZED CADMIUM HALIDE GLASSES

[75] Inventors: Bruce G. Aitken, Corning; Frank A. Annunziata, Horseheads; Roger F. Bartholomew, Painted Post; Mark A. Newhouse, Corning; Mark L. Powley, Campbell; Andrea L. Sadd, Corning, all of N.Y.

[73] Assignee: Corning Incorporated, Corning, N.Y.

[21] Appl. No.: 947,446

[22] Filed: Sep. 21, 1992

[51] Int. Cl.$^5$ .......................... C03C 4/100; P03C 3/32
[52] U.S. Cl. ...................................... 501/40; 501/152; 501/151; 501/904
[58] Field of Search ................. 501/40, 904, 151, 152

[56] References Cited

U.S. PATENT DOCUMENTS 4,647,545  3/1987  Lucas et al. .......................... 501/40

OTHER PUBLICATIONS

Jha and Parker in "Preparation of Infrared Transmitting CdF$_2$ Based Mixed Halide Glasses", *Physics and Chemistry of Glasses*, 32, No. 1, Feb. 1991, pp. 1–12.

J. L. Mouric et al in Progress in Cadmium Halide Glasses, *Materials Science Forum*, vol. 5, pp. 135–144 (1985).

M. Matecki et al in Alkali Cadmium Halide Glasses, *Fourth International Symposium on Halide Glasses*, Jan. 26–29, 1987, pp. 470–476.

M. Matecki et al in Composition Adjustments in Cadmium Fluorochloride Glasses, *Journal of Non-Crystalline Solids*, 140, pp. 82–86 (1992).

*Primary Examiner*—Mark L. Bell
*Assistant Examiner*—C. M. Bonner
*Attorney, Agent, or Firm*—C. S. Janes, Jr.

[57] ABSTRACT

This invention is directed to the production of transparent glasses exhibiting transmission far into the infrared regime of the radiation spectrum. The glasses consist essentially, in mole percent, of 42–55% CdF$_2$ and/or CdCl$_2$, 2–15% BaF$_2$ and/or BaCl$_2$, 30–40% NaF and/or NaCl, 2–7% KF and/or KCl, 1–12% total of at least one stabilizing metal halide selected from the group LiX, BeX$_2$, MgX$_2$, MnX$_2$, PbX$_2$, TlX, CoX$_2$, and ZnX$_2$, and 0.005–0.5% ReX$_3$, wherein Re is at least one rare earth metal selected from the lanthanide series of rare earth metals and X is at least one halide selected from the group consisting of fluoride, chloride, and bromide.

4 Claims, No Drawings

RARE EARTH-DOPED, STABILIZED CADMIUM HALIDE GLASSES

BACKGROUND OF THE INVENTION

This invention is directed toward the preparation of stabilized, rare earth metal-doped cadmium halide glasses exhibiting excellent transmission far into the infrared region of the electromagnetic radiation spectrum.

Glasses transmitting in the infrared portion of the radiation spectrum have long been of interest as potential candidates for ultra-low loss optical fibers. More recently it has been recognized that these same materials, when doped with rare earth metals, can demonstrate properties rendering them eminently suitable for making efficient lasers, amplifiers, and upconverters.

The peculiar characteristic of a material that imparts the ability to transmit radiation far into the infrared region is the same one which makes the material a good host of rare earth metals for the three above-mentioned applications. That singular property comprises a low fundamental vibrational frequency (phonon energy) which is typically associated with the strongest chemical bond of the material matrix. For example, the more ionic metal fluorine bond in a fluoride material is weaker than the more covalent metal oxygen bond in an oxide material which, in turn, results in the fluoride material exhibiting superior infrared transmission. Moreover, in a given class of materials, bonds are weaker and, hence, infrared transmission is improved, when the component ions are heavy and/or have low valence. Thus, within the particular class of halide glasses, the cadmium-based glasses have more extended transmission of infrared radiation than the well known glasses based on either $BeF_2$ or $ZrF_4$.

Radiative emission of rare earth metal-doped materials is based upon electronic transitions between atomic-like 4f levels that are localized on the rare earth metal ions. From a particular level radiative emissions compete with non-radiative emissions. Often the dominant non-radiative process is the emission of one or more phonons. The probability of this non-radiative process is known to decrease exponentially with the number of phonons required to bridge the energy gap of the transition. Therefore, materials with low-phonon energies will require more phonons to bridge that gap and, hence, will have less competitive non-radiative emission processes and higher radiative efficiencies, thereby enhancing any process which depends upon fluorescence between rare earth metal levels.

Three basic devices can be made with rare earth metal-doped materials, viz., lasers, amplifiers, and upconverters. Lasers demand good radiative efficiency for the laser transition. Amplifier efficiency is similarly directly tied to radiative efficiency. In fact, only those transitions separated by more than twice the phonon energy of the host material can be made to lase or amplify. Consequently, the lower the material phonon energy, the larger the number of transitions that can be made to lase or amplify. In an upconversion device light is converted from a longer wavelength, e.g., in the infrared, to a short wavelength, e.g., in the visible. Such a process can be used both for detecting long wavelength light and as a source of short wavelength light. The simplest upconversion process is generally a two-step process, first involving the absorption of a long wavelength photon followed by the promotion of an electron to an intermediate level. From this intermediate level the electron is further promoted to a higher level through the absorption of a second photon (so-called excited state absorption) or through the exchange of energy with another excited rare earth metal ion (so-called energy transfer upconversion). Clearly, the efficiency of emission from the final state will be positively correlated with the radiative efficiency of the transition from the upper state. In addition, the efficiency will also be positively correlated with the lifetime of the electrons in the intermediate state. The longer the lifetime (before the electron decays back towards the ground state), the longer a given electron will be available for excited state absorption energy transfer upconversion and, therefore, the greater the probability of such a promotion. Accordingly, as the probability of the non-radiative processes is reduced in a material with a lower phonon energy, the excited state lifetimes are longer, thereby rendering the multi-step upconversion process more efficient.

Cadmium halide-containing glasses comprise one class of glasses with very low phonon energies. The cations present in those glasses are monovalent and/or divalent. Moreover, the most stable cadmium halide glasses contain a mixture of light (fluoride) and heavier (chloride) anions. As a result, these glasses have more extended transmissions in the infrared than do other halide glasses based upon zirconium, hafnium, uranium, indium, and/or aluminum fluorides.

Nevertheless, unlike heavy metal fluoride glasses, the cadmium halide glasses become less stable with the addition of trivalent cations, such as the rare earth metals. For example, the addition of as little as 0.1 mole percent of praseodymium halide is sufficient to convert an otherwise stable and clear cadmium chloride-containing glass into an opaque, partially devitrified material. This behavior was observed by Jha and Parker in "Preparation of Infrared Transmitting $CdF_2$ Based Mixed Halide Glasses", *Physics and Chemistry of Glasses.* 32. No. 1, February 1991, pages 1–12. Thus, at page 7 the author stated:

> Our results indicate that trivalent fluorides cannot be incorporated into mixed halide glasses as they can into heavy metal fluoride glasses. $LaF_3$ and $YF_3$ caused crystallization while $AlF_3$ dissolves to a limited extent, but at the expense of the infrared cutoff edge (see next section) and even in this case only 2 mol % could be added without significant crystallization. Similarly, $BiCl_3$ cannot be incorporated in these glasses, which seems to suggest that it is either the chemical nature or the size of these trivalent halides that decides their solubility.

The primary objective of the present invention was to discover means for producing stable, transparent cadmium halide glasses containing trivalent rare earth metal cations, which glasses exhibit excellent transmission far into the infrared portion of the radiation spectrum, thereby commending their utility in the fabrication of efficient lasers, amplifiers, and upconverters.

SUMMARY OF THE INVENTION

We have found that the above objective can be achieved through the addition of small amounts of halide (X), customarily a fluoride, chloride, and/or bromide, of relatively light monovalent and divalent cations, such as $Li^+$, $Be^{+2}$, $Mg^{+2}$, $Mn^{+2}$, $Co^{+2}$, and $Zn^{+2}$, in order to suppress the tendency of cadmium halide (CdX) glass compositions doped with a trivalent rare earth metal to crystallize and/or to opalize. Thus, as was observed above, the incorporation of only 0.1 mole percent of $PrCl_3$ into a $CdCl_2$-containing glasses caused the development of extensive devitrification therein, the crystals being tentatively identified as $CdCl_2$. The inclusion of 3 mole percent LiF yielded a clear, homogeneous glass. Laboratory investigations have indicated that rare earth metal-doped, CdX-containing glasses can be stabilized to exhibit excellent transparency both in the visible and infrared regimes of the radiation spectrum through the inclusion of about 1-5 mole percent of a stabilizing halide. Greater amounts of a stabilizing halide may be included, e.g., up to 10 mole percent, but with no apparent substantive advantage. Those investigations have led to the appreciation that, although the effect is not expressly limited thereto, the following cations demonstrate a superior action and, hence, are preferred: $Li^+$, $Be^{+2}$, $Mn^{+2}$, $Co^{+2}$, and $Zn^{+2}$.

We have found that lead halides in amounts up to 12 mole percent, preferably up to 10 mole percent, and thallium halides in amounts up to 7%, preferably up to 5 mole percent, exert a similar, albeit less pronounced, stabilizing effect on rare earth metal-doped, CdX-containing glasses. The addition of lead and/or thallium halides to the base glass compositions can provide the further advantage of raising the refractive index of the glass. For example, a cadmium halide-containing glass composition incorporating about 10 mole percent of a lead halide can exhibit a refractive index of up to 1,668. In contrast, lead-free glasses of the same base composition will exhibit a refractive index of about 1,613. That circumstance strongly recommends the use of the inventive glasses as transparent glass core portions for optical waveguide structures.

Thus, as is well recognized in the art, an optical waveguide consists of a transparent glass core portion enveloped within a transparent compatible glass cladding layer which exhibits a lower refractive index than the core glass. The term "compatible" indicates the essential absence of any deleterious reaction taking place at the interface between the core and cladding glasses. Accordingly, the inventive rare earth metal-doped glasses can comprise the core glass with a compatible glass demonstrating a lower refractive index constituting the cladding glass. To assure a high refractive index, a lead halide and/or a thallium halide will be included in the composition. In general, the core glass will contain up to 10% total of 1-10% $PbX_2$ and/or 1-5% TlX. For example, a praeseodymium-doped, lead and/or thallium-containing glass exhibiting a high refractive index would be especially desirable as the core composition for a waveguide structure with an undoped, lead and thallium-free glass serving as the cladding.

We have found that the following base glass compositions, expressed in terms of mole percent, when stabilized with up to 12 mole percent, preferably 1-5 mole percent, of a stabilizing halide and doped with at least 0.005 mole percent, preferably 0.05-0.5 mole percent, of at least one rare earth metal halide selected from the lanthanide series of rare earth metals ($ReX_3$), display properties strongly recommending them for use in lasers, amplifiers, and upconverters.

| | |
|---|---|
| $CdF_2$ and/or $CdCl_2$ | 42-55 |
| $BaF_2$ and/or $BaCl_2$ | 2-15 |
| NaF and/or NaCl | 30-40 |
| KF and/or KCl | 2-7 | wherein up to about 10 mole % total of at least one metal of the group of Cd, Ba, Na, and K can be incorporated as a bromide. Levels of rare earth metal halide dopant in excess of 0.5 mole percent are operable, but with no substantive advantage. The lanthanide series of rare earth metals includes La, Ce, Pr, Nd, Pm, Sm, Eu, Gd, Tb, Dy, Ho, Er, Tm, Yb, and Lu.

We have found that up to 2.5 mole percent total of non-essential, but useful, metal halides, such as $AlX_3$, $GaX_3$, and $InX_3$, wherein X is selected from the group of fluoride, chloride, and bromide, may be included to modify the proportions of the base glass, most generally to adjust the refractive index thereof. Individual additions will consist of up to 1.5% $AlX_3$, up to 1.5% $GaX_3$, and up to 2% $InX_3$. In the preferred glasses the $AlX_3$ concentration will not exceed 1%, the $GaX_3$ concentration will not exceed 1%, the $InX_3$ concentration will not exceed 1.5%, and the total of all such additions will not exceed 2%.

PRIOR ART

In addition to the Jha and Parker journal article briefly discussed above, the following literature references are of interest:

J. L. Mouric et al. in PROGRESS IN CADMIUM HALIDE GLASSES, *Materials Science Forum*, Volume 5, pp. 135-144 (1985), describe their laboratory work in preparing glasses within the following four systems:
$CdCl_2$—$CdF_2$—NaCl or NaF
$CdF_2$—NaCl—$BaCl_2$ or $BaF_2$
$BaCl_2$—NaF—$CdCl_2$ or $CdF_2$
$BaF_2$—NaF—$CdCl_2$ or $CdF_2$
There is no discussion of doping those glasses with rare earth metals such that the authors were unaware of the glass stability problem giving rise to the present invention.

M. Matecki et al. in ALKALI CADMIUM HALIDE GLASSES, *Fourth International Symposium on Halide Glasses*, Jan. 26-29, 1987, pages 470-476, reviewed their investigations of glass forming compositions within the following ternary systems:
$CdCl_2$—$CdF_2$—KF
$CdCl_2$—$CdF_2$—KCl
$CdCl_2$—$CdF_2$—KBr
$CdCl_2$—$CdF_2$—KI
$CdCl_2$—$CdF_2$—KI
$CdCl_2$—NaF—KCl
$CdCl_2$—NaF—KBr
$CdCl_2$—NaF—KI No mention is made of doping those glasses with rare earth metals.

M. Matecki et al. in COMPOSITION ADJUSTMENTS IN CADMIUM FLUOROCHLORIDE GLASSES, *Journal of Non-Crystalline Solids*, 140, pages 82-86 (1992) disclose their laboratory work in evaluating the utility of adding $SrF_2$, $InF_3$, or KF to cadmium fluorochloride glasses containing Na and Ba. No reference is made of doping cadmium halide-containing glasses with rare earth metals.

U.S. Pat. No. 4,647,545 (Lucas et al.) is also of interest in that it discloses in very general and broad terms the formation of glasses containing at least one member of the group of cadmium halide, manganese halide, and zinc halide. Whereas the patentees refer to possible glass forming composition areas in very broad terms, including the possibility of incorporating rare earth metals in those compositions, there is no apparent recognition of the lack of glass stability problem when a rare earth metal is included in the composition, much less providing a solution to that problem. That is, the heart of the present invention resides in the finding of metal chlorides, bromides, and fluorides which, when incorporated into the base cadmium halide-containing composition, will so stabilize the glass that the inclusion of a rare earth metal will not result in devitrification of the glass. Lucas et al. make no mention of the problem and do not provide a working example having a composition coming within the ranges of the present invention such as to constitute an accidental disclosure.

DESCRIPTION OF PREFERRED EMBODIMENTS

Table I records a group of glass compositions, expressed in terms of mole percent, illustrative of the inventive glasses. The glasses were prepared by compounding the batch ingredients, thoroughly mixing the ingredients together to assist in achieving a homogeneous melt, and then charging the batch mixtures into vitreous carbon crucibles. The crucibles were introduced into a dry glove box under a nitrogen atmosphere. The crucibles were heated to 800° C. and, after a period of 30 minutes, the temperature was reduced to 700° C. and the crucibles were maintained at that temperature for 15 minutes to assure a minimum water content in the resultant glasses. The melts were poured into steel molds to form cylindrical rods having a diameter of 4 mm and a length of 50 mm which were transferred immediately to an annealer operating at about 125° C.

TABLE I

| | 1 | 2 | 3 | 4 | 5 | 6 | 7 | 8 |
|---|---|---|---|---|---|---|---|---|
| $CdF_2$ | 16.5 | 16.5 | 17.0 | 17.0 | 17.0 | 17.0 | 16.0 | 45.5 |
| $CdCl_2$ | 30.1 | 30.1 | 33.0 | 33.0 | 33.0 | 33.0 | 33.5 | 4.3 |
| $BaF_2$ | 5.8 | 5.8 | 10.0 | 10.0 | 10.0 | 10.0 | 2.5 | 7.0 |
| NaF | 32.0 | 32.0 | 34.0 | 34.0 | 34.0 | 34.0 | 29.0 | 33.8 |
| KF | 2.9 | 2.9 | 3.0 | 3.0 | 3.0 | 3.0 | 6.0 | 2.4 |
| LiF | — | — | 3.0 | — | — | — | — | — |
| $MnCl_2$ | 2.9 | — | — | — | — | — | — | — |
| $ZnCl_2$ | — | 2.9 | — | 3.0 | 3.0 | 3.0 | 3.0 | 3.0 |
| $PbF_2$ | 3.9 | 3.9 | — | — | — | — | 7.0 | — |
| $PbCl_2$ | 3.9 | 3.9 | — | — | — | — | — | — |
| $PbBr_2$ | 1.9 | 1.9 | — | — | — | — | 3.0 | — |
| $PrCl_3$ | 0.05 | 0.05 | 0.05 | 0.05 | 0.1 | 0.15 | 0.05 | 0.05 |
| TlCl | — | — | — | — | — | — | — | 4.0 |

| | 9 | 10 | 11 | 12 | 13 | 14 | 15 | 16 |
|---|---|---|---|---|---|---|---|---|
| $CdF_2$ | 17.0 | 17.0 | 17.0 | 50.0 | 17.0 | 45.5 | 45.5 | 45.5 |
| $CdCl_2$ | 33.0 | 28.0 | 33.0 | — | 33.0 | 4.5 | 4.5 | 4.5 |
| $BaF_2$ | 12.0 | 13.0 | 10.0 | — | 10.0 | — | — | — |
| $BaCl_2$ | — | — | — | 10.0 | — | 10.0 | 9.6 | 8.5 |
| NaF | 34.0 | 34.0 | 34.0 | — | 34.0 | — | — | — |
| NaCl | — | — | — | 34.0 | — | 34.0 | 34.0 | 34.0 |
| KF | 3.0 | 3.0 | 3.0 | — | 3.0 | — | — | — |
| KCl | — | — | — | 3.0 | — | 3.0 | 3.0 | 3.0 |
| $BeF_2$ | 0.5 | 5.0 | — | — | — | — | — | — |
| $MgF_2$ | 0.5 | — | — | — | — | — | — | — |
| $ZnCl_2$ | — | — | — | 3.0 | 3.0 | 3.0 | 3.0 | 3.0 |
| $CoCl_2$ | — | — | 3.0 | — | — | — | — | — |

TABLE I-continued

| | | | | | | | | |
|---|---|---|---|---|---|---|---|---|
| $PrCl_3$ | 0.1 | 0.1 | 0.1 | 0.05 | — | — | 0.05 | 0.05 |
| $NdF_3$ | — | — | — | — | 0.05 | — | — | — |
| $ErF_3$ | — | — | — | — | — | 0.10 | — | — |
| $InF_3$ | — | — | — | — | — | — | 0.4 | 1.5 |

It has proven to be possible to optically evaluate the inventive glasses for their suitability as hosts for rare earth metal dopants. To illustrate, in the case of the inventive glasses doped with praeseodymium, which glasses are of particular interest for use as single mode optical fiber amplifiers operating at 1.3 μm, the glasses have been characterized by measuring the decay of the 1.3 ∞m fluorescence. Results of those measurements are recorded below in Table II in terms of microseconds. Table II indicates that the inventive glasses can have fluorescence lifetimes that are as long as about 300 μsec and, consequently, represent a significant improvement over the lifetimes of the current benchmark, viz., ZBLAN glasses exhibiting lifetimes of about 110 μsec.

TABLE II

| | 1 | 2 | 3 | 4 | 5 | 6 | 8 | 10 | 15 | 16 |
|---|---|---|---|---|---|---|---|---|---|---|
| μsec | 246 | 276 | 200 | 268 | 240 | 212 | 230 | 262 | 270 | 262 |

In the case of erbium-doped glasses, illustrated in Example 14, the glasses exhibited a strong emission of green light, peaking at about 523 nm, 542 nm, and 551 nm, when pumped with 800 nm light, indicating their potential utility as an upconversion source.

The preferred inventive compositions consist essentially, in mole percent, of 44–52% $CdF_2$ and/or $CdCl_2$, 4–11% $BaF_2$ and/or $BaCl_2$, 30–35% NaF and/or NaCl, and 2–6% KF and/or KCl, wherein up to 7total of at least one metal selected from the group of Cde, Ba, Na, and K can be incorporated as a bromide, along with 1–5% total of at least one stabilizing metal halide selected from the group consisting of LiX, $BeX_2$, $MgX_2$, $MnX_2$, $CoX_2$, and $ZnX_2$, wherein X is at least one halide selected from they group consisting of fluioride, chloride, and bormide, optionally up to 10% of a lead halide selected from the group consisting of fluoride, chloride, and bromide, optionally up to 10% of a lead halide selected from the group of $PbF_2$, $PbCl_2$, and $PbBr_2$, optionally up to 5% TlF, TlCl, and TlBr, and 0.025–0.25% $ReX_3$, wherein Re is at least one rare earth metal selected from the lanthanide series of rare earth metals and X is a halide selected from the group consisting of fluoride, chloride, and bromide. No more than a total of 1.5% of non-essential metal halides will be included.

Example 2 is the most preferred composition.

We claim:

1. A transparent glass exhibiting excellent transmission far into the infrared region of the electromagnetic radiation spectrum consisting essentially, expressed in terms of mole percent, of 42–55% $CdF_2$ and/or $CdCl_2$, 2–15% $BaF_2$ and/or $BaCl_2$, 30∝40% NaF and/or NaCl, 2–7% KF and/or KCl, 1–12% total of at least one stabilizing metal halide in the indicated proportion selected from the group consisting of 0–10% LiX, 0–10% $BeX_2$, 0–10% $MgX_2$, 0–10% $MnX_2$, 0–12% $PbX_2$, 0–10% $CoX_2$, 0–7% TlX, and 0–10% $ZnX_2$, wherein X is at least one halide selected from the group consisting of fluoride, chloride, and bromide, and 0.005–0.5% $ReX_3$, wherein Re is at least one rare earth metal selected from the lanthanide series of rare earth metals and X is at least one halide selected from the group consisting of fluoride, chloride, and bromide, and wherein up to 10% total of at least one metal selected from the group consisting of Cd, Ba, Na, and K can be incorporated as a bromide.

2. A transparent glass according to claim 1 also containing up to 2.5% total of at least one metal halide in the indicated proportion selected from the group consisting of 0–1.5% $AlX_3$, 0–1.5% $GaX_3$, and 0–2% $InX_3$, wherein X is at least one halide selected from the group consisting of fluoride, chloride, and bromide.

3. A transparent glass according to claim 1 consisting essentially of 44–52% $CdF_2$ and/or $CdCl_2$, 4–11% $BaF_2$ and/or $BaCl_2$, 30–35% NaF and/or NaCl, 2–6% KF and/or KCl, 1–5% total of at least one stabilizing metal halide selected from the group consisting of LiX, $BeX_2$, $MgX_2$, $MnX_2$, $CoX_2$, and $ZnX_2$, wherein X is at least one halide selected from the group consisting of fluoride, chloride, and bromide, up to 10% total of a lead halide selected from the group consisting of $PbF_2$, $PbCl_2$, and PbBr2, up to 5% total of a thallium halide selected from the group consisting of TlF, TlCl, and TlBr, and wherein up to 7% total of at lest one metal selected from the group consisting of Ca, Ba, Na, and K can be incorporated as a bromide.

4. A transparent glass according to claim 3 also containing up to 2% total of at least one metal halide in the indicated proportions selected for the group consisting of 0–1% $AlK_3$, 0–1% $GaX_3$, and 0–1.5% $InX_3$, wherein X is selected from the group consisting of fluoride, chloride, and bromide.

* * * * *

UNITED STATES PATENT AND TRADEMARK OFFICE
CERTIFICATE OF CORRECTION

PATENT NO. : 5,240,885
DATED : August 8, 1993
INVENTOR(S) : Bruce G. Aitken, et al It is certified that error appears in the above-indentified patent and that said Letters Patent is hereby corrected as shown below:

Column 2, line 51, "$BiC_{13}$"
should read --"$BiCl_3$--.

Column 3, line 6, "$PrC_{13}$"
should read --$PrCl_3$--.

Column 3, line 22, "$Be^{+2}$, $Mn^{+2}$"
should read --$Be^{+2}$, $Mg^{+2}$, $Mn^{+2}$--.

Column 4, line 54, "$CdCl_2-CdF_2-KI$"
should read --$CdCl_2-NaF-KF$--.

Column 6, line 14, "1.3 ∞m"
should read --1.3 $\mu$m--.

Column 6, line 36, "7total"
should read --7% total--.

Column 6, line 37, "Cde"
should read --Cd--.

UNITED STATES PATENT AND TRADEMARK OFFICE
CERTIFICATE OF CORRECTION

PATENT NO. : 5,240,885

DATED : August 8, 1993

INVENTOR(S) : Bruce G. Aitken, et al

It is certified that error appears in the above-indentified patent and that said Letters Patent is hereby corrected as shown below:

Column 6, line 42, "from they" should read --from the--.

Column 6, line 42, "fluioride" should read --fluoride--.

Column 6, line 43, "bormide" should read --bromide--.

Column 6, line 60, "30 ∝ 40% NaF" should read --30-40% NaF--.

Column 8, line 14, "AlK$_3$" should read --AlX$_3$--.

Signed and Sealed this

Twenty-second Day of March, 1994

BRUCE LEHMAN

Attest:

Attesting Officer

Commissioner of Patents and Trademarks